April 22, 1969 A. P. CLARK 3,440,345

DATA RECEIVER FOR DIGITAL CHARACTER DIVIDED INTO TWO HALVES, EACH HALF EMPLOYING QUATERNARY FREQUENCY MODULATION

Filed Jan. 29, 1965 Sheet 1 of 10

April 22, 1969 A. P. CLARK 3,440,345

DATA RECEIVER FOR DIGITAL CHARACTER DIVIDED INTO TWO HALVES, EACH HALF EMPLOYING QUATERNARY FREQUENCY MODULATION

Filed Jan. 29, 1965 Sheet 2 of 10

April 22, 1969 A. P. CLARK 3,440,345

DATA RECEIVER FOR DIGITAL CHARACTER DIVIDED INTO TWO HALVES, EACH HALF EMPLOYING QUATERNARY FREQUENCY MODULATION

Filed Jan. 29, 1965

Sheet 3 of 10

United States Patent Office 3,440,345
Patented Apr. 22, 1969

3,440,345

DATA RECEIVER FOR DIGITAL CHARACTER DIVIDED INTO TWO HALVES, EACH HALF EMPLOYING QUATERNARY FREQUENCY MODULATION

Adrian Percy Clark, Taplow, England, assignor to British Telecommunications Research Limited, Taplow, England, a British company Filed Jan. 29, 1965, Ser. No. 428,934
Claims priority, application Great Britain, Jan. 30, 1964, 4,015/64
Int. Cl. H04l 5/00, 27/00; H04b 1/06
U.S. Cl. 178—50 10 Claims

ABSTRACT OF THE DISCLOSURE

A receiver for an electrical signalling system employing frequency modulation in which 8-bit characters are transmitted over two data channels each of which uses four fixed frequency signals each of which represents a different pair of bits. A further two frequencies are used for timing signals. The receiver uses tuned circuit detectors.

Figure 1:
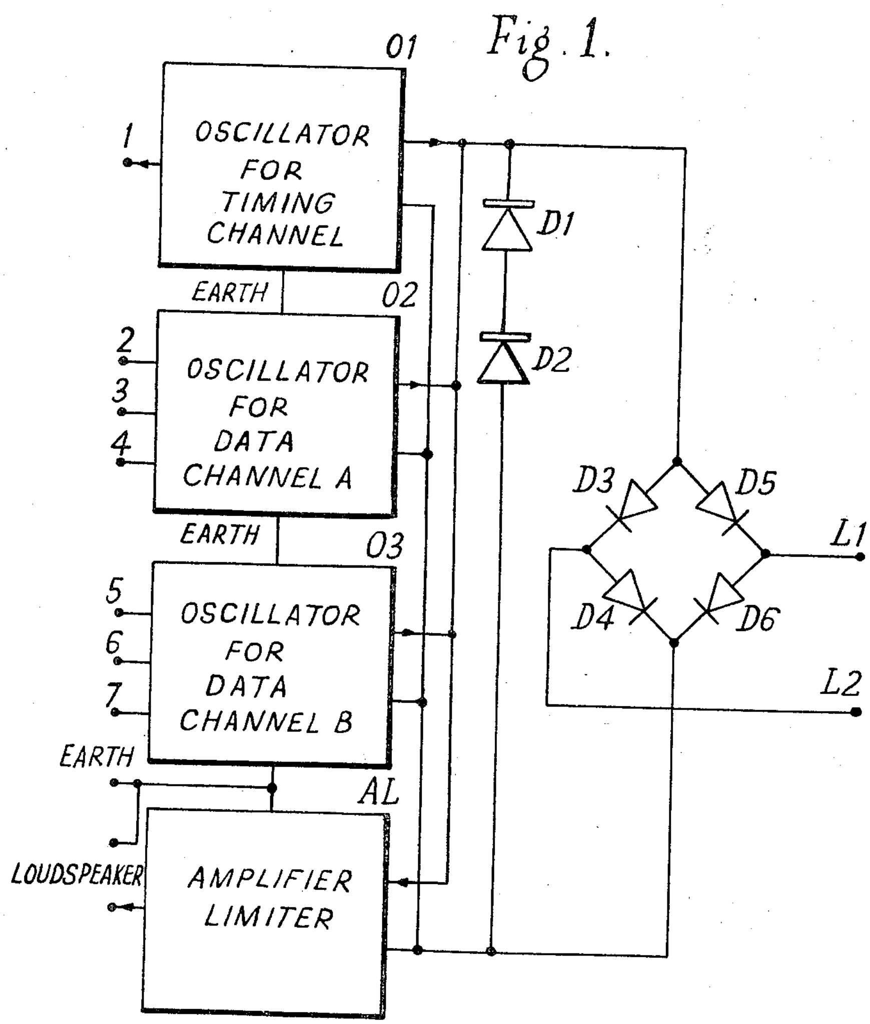

The present invention relates to electrical signalling systems and is more particularly concerned with systems suitable for data transmission over an ordinary telephone line.

In practical systems of this type, it is often necessary to transmit data from a number of outlying points to a central receiving point, the transmitters being used for comparatively short periods so that one or two receivers employed almost full time can cater for a large number of transmitters. In these circumstances it is obviously desirable that the transmitters, of which there may be quite a large number, shall be as simple as possible, even at the cost of some additional complexity in the small number of receivers. These circumstances also make it desirable not to use a fixed modulation rate as this implies timing equipment and hence additional cost and complexity in the transmitter. However, if there is no fixed timing provided at the transmitter, it is necessary that there shall be some indication at the receiver of the start of each signal element, and this can most conveniently be provided by transmitting timing information over a separate channel.

The chief object of the present invention is to provide a signalling system suitable for the transmission as rapidly as possible of multi-bit characters over a transmission medium of limited band-width such as an ordinary telephone line.

According to the invention, the system employs frequency modulation, that is to say signals of different frequencies are transmitted, on a combined serial and parallel basis using quaternary frequency modulation over two distinct channels so that a character of 8 bits may readily be transmitted.

Preferably the character is transmitted in two halves and a separate channel is used for transmitting timing information which may be by binary frequency modulation. If the timing transmission channel makes use of frequencies which are not employed for data transmission, which is the preferred arrangement, this will give a total of 10 different frequencies, and 3 will always be transmitted for each of the two halves or elements comprising a character. The 10 frequencies to be used are preferably evenly spaced, and care is taken in their selection that they do not tend to produce difference frequencies approaching 600 and 750 c./s. which are already used for controlling telephone switching operation in the existing telephone network.

Since the timing channel employs only two frequencies which are preferably adjacent so that this channel occupies a comparatively narrow band, there is not likely to be much difference in the attenuation of the circuit at the two frequencies and consequently the power level will not vary significantly whichever of the frequencies is being transmitted. Accordingly the level of the detected timing signal in the receiver may be used to operate a carrier detection circuit whose function is to indicate loss of signal when ths occurs. This signal can also be used to operate automatic gain control equipment to cater for changes in transmission characteristics but in the preferred form of the invention other measures, are taken which render this unnecessary.

With the signal detectors which it is proposed to use according to the invention, the received input level is rendered constant by the use of an amplifier-limiter, and this ensures that a certain output level is reached if the signal in question is substantially pure. If however the input includes a substantial amount of other frequencies, as might occur due to interference or noise on the line, since the total energy level remains substantially constant, the output level of the signal of the required frequency is significantly lower. This gives the possibility for error detection, since it is a reasonable assumption that if the power level of the received signal is less than say 50% of the maximum, there has been serious interference which is likely to render doubtful the authenticity of the received character. Accordingly, if the signal falls below a predetermined minimum, this is regarded as evidence of a mutilated character and action is taken to call for retransmission.

Figure 2:
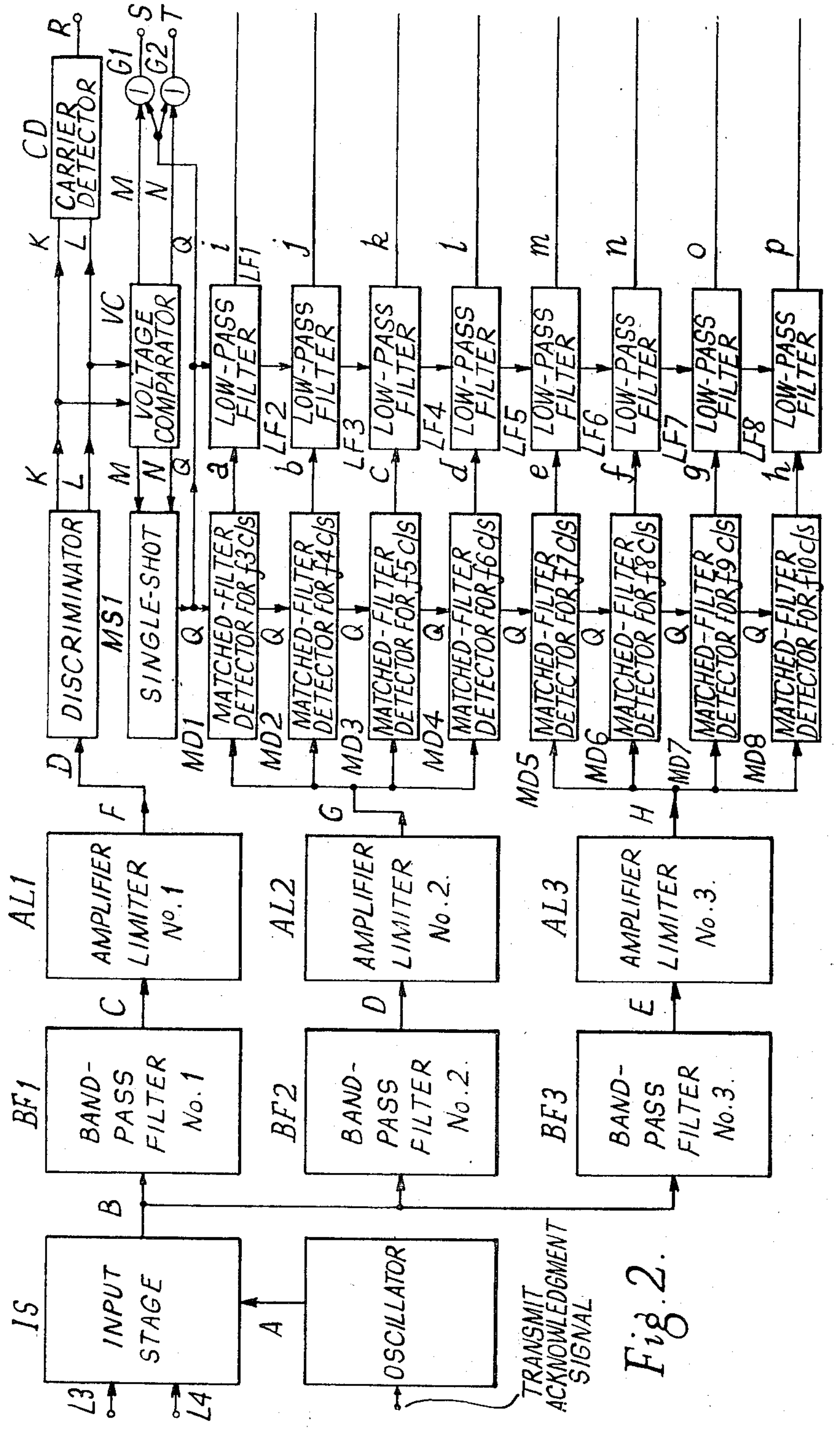
Figure 3:
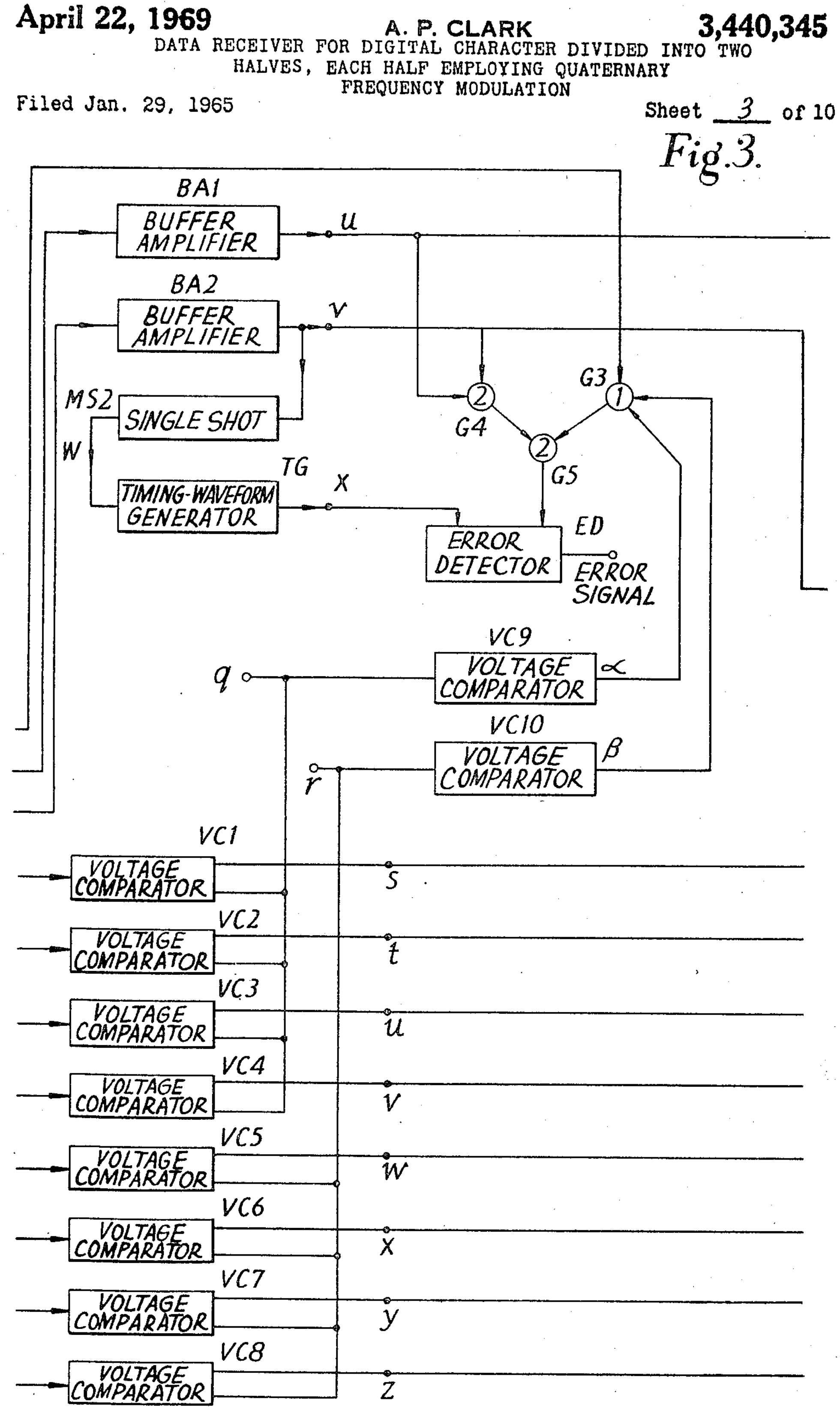
Figure 4:
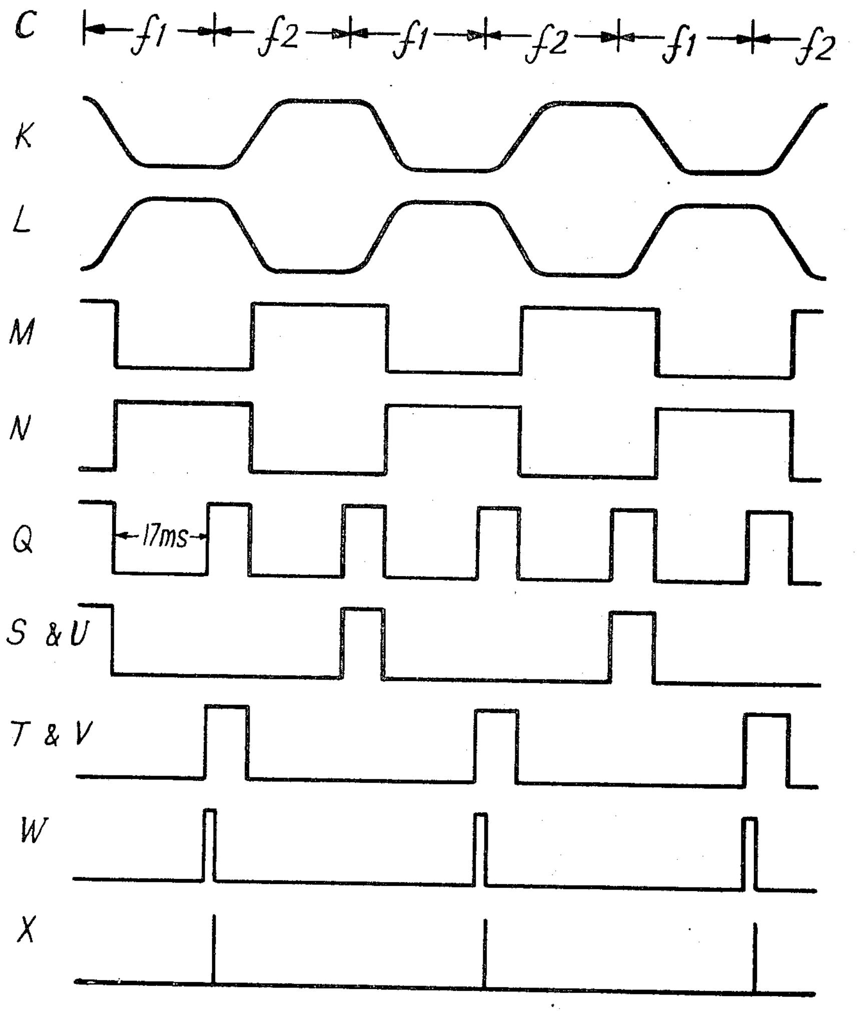
Figure 5:
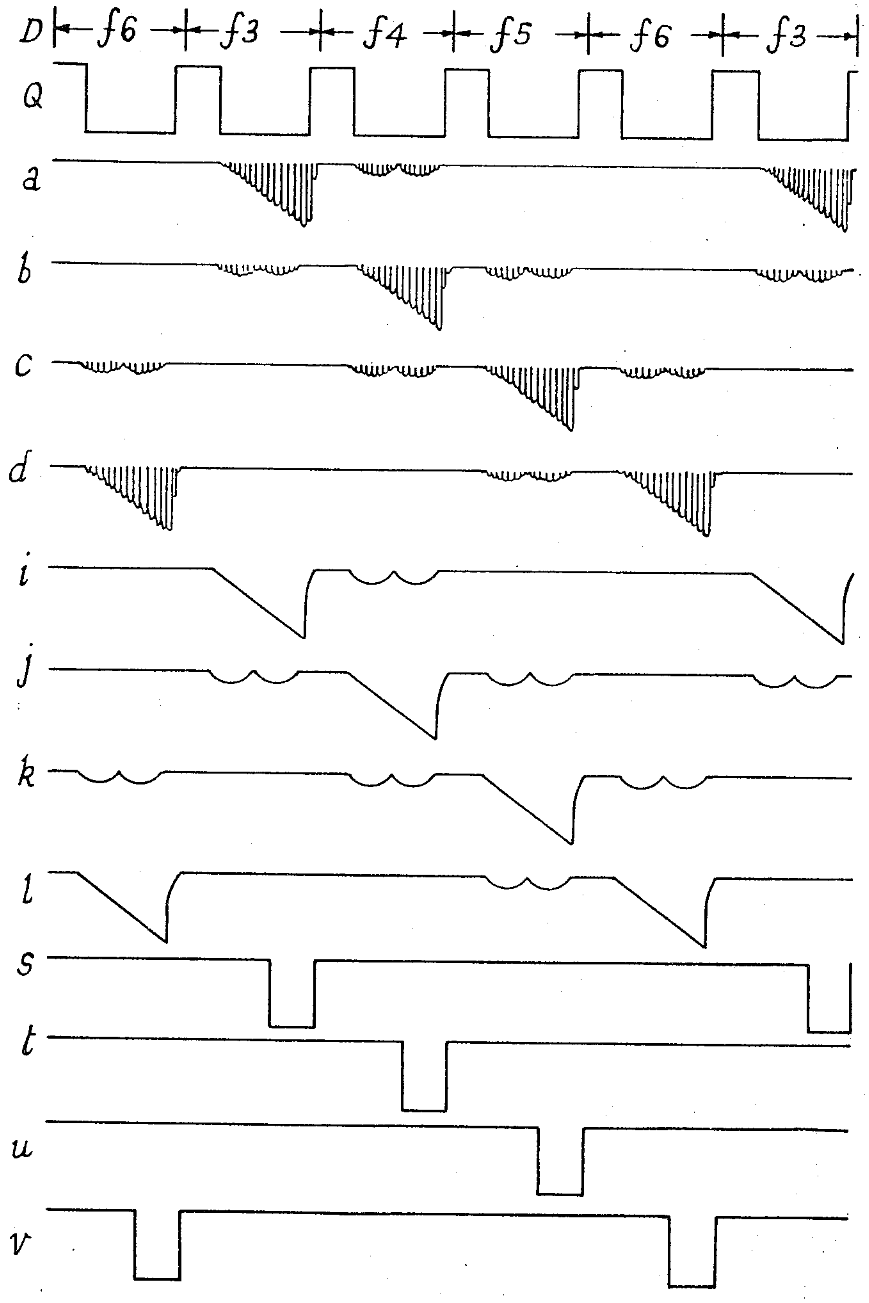
Figure 6:
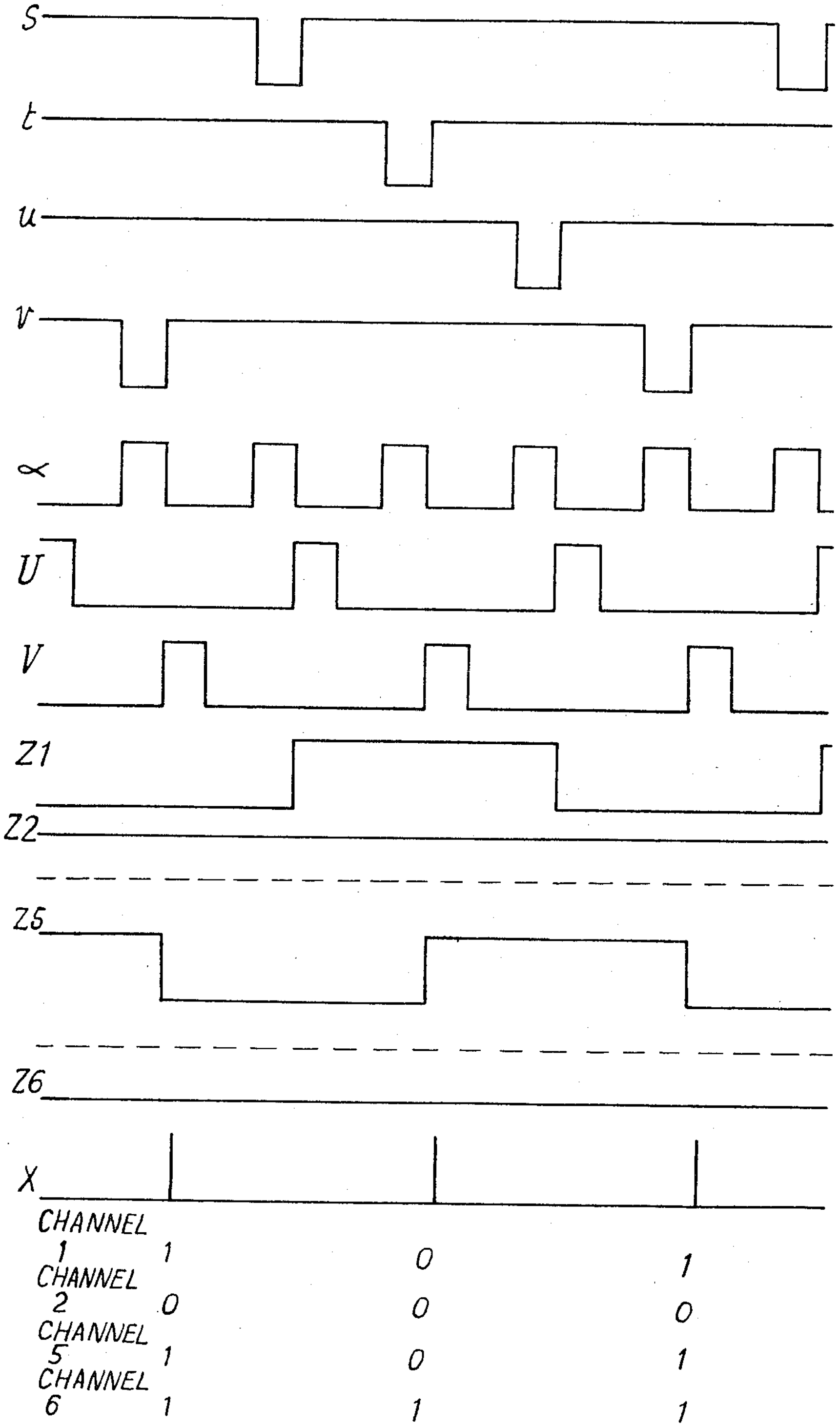
Figure 9:
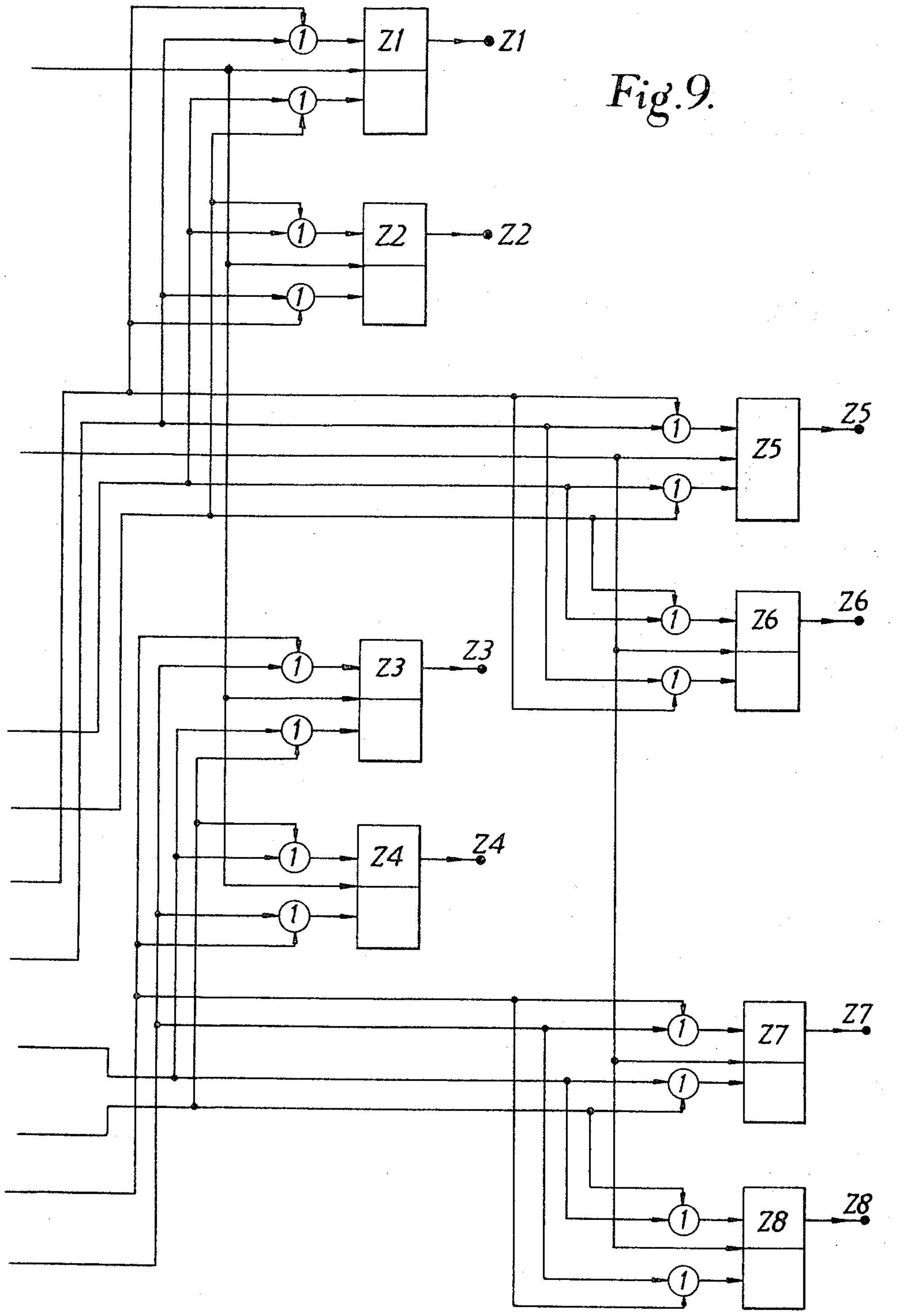
Figure 10:
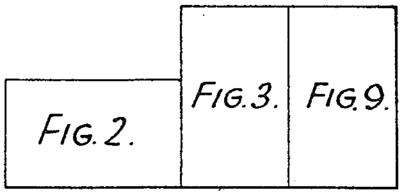
Figure 11:
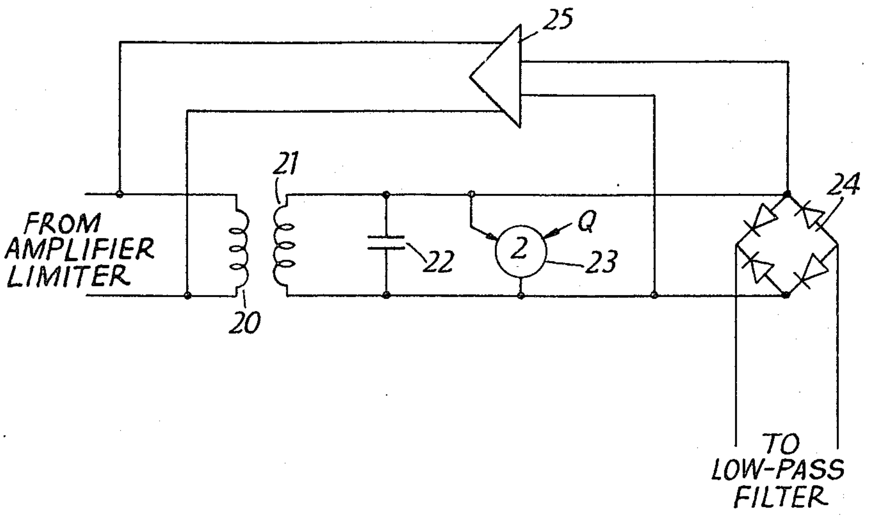
Figure 12:
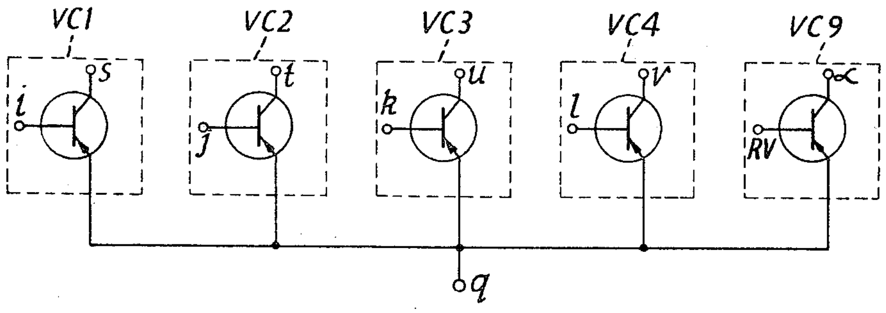

The invention will be better understood from the following description of a preferred form of carrying it into effect which should be taken in conjunction with the accompanying drawings comprising FIGURES 1–12. Of these, FIGURE 1 is a block diagram of the equipment at the transmitting end. FIGURES 2, 3 and 9 represent a similar block diagram for the equipment at the receiving end, while FIGURE 4 shows waveforms for the timing channel and FIGURES 5–8 show typical waveforms for the two data channels A and B. FIGURES 5 and 6 and similarly 7 and 8 are in fact continuous and in order to facilitate appreciation of the time relationship of the various waveforms, four of these in FIGURE 5 appear again in FIGURE 6 and similarly with FIGURES 7 and 8. With the values which have been chosen to illustrate the working of the invention, the waveforms corresponding to the two different data channels are in fact identical. FIGURE 10 shows how FIGURES 2, 3 and 9 are to be assembled to form a single diagram. FIGURE 11 is a schemtic diagram showing one of the elements of the receiver. FIGURE 12 is a schematic diagram showing another element of the receiver in a simplified form.

As suggested above it is assumed that the system is designed for the transmission of 8-bit characters for instance from a paper tape. This is done by separating the eight bits of each character into two groups of four bits. Two data channels are used, one for each group of four bits. Each data channel transmits two elements per character and employs quaternary frequency modulation. Moreover, a separate timing channel is used which employs two frequencies different from those used in the data channels. One of these frequencies is transmitted during the first element of the character and the other during the second element. It is assumed moreover that transmission is taking place over a telephone line, the available frequency range of which extends from 900 to 2,000 c./s.

As previously pointed out, a total of 10 different frequencies is required for the system, and adjacent frequencies are preferably separated by the same amount. Bearing in mind the various considerations which arise, the frequencies have been chosen as follows:

| | c./s. |
|---|---|
| Timing channel: | |
| $f_1$ | 960 |
| $f_2$ | 1,073 |
| Data Channel A: | |
| $f_3$ | 1,186 |
| $f_4$ | 1,299 |
| $f_5$ | 1,412 |
| $f_6$ | 1,525 |
| Data Channel B: | |
| $f_7$ | 1,638 |
| $f_8$ | 1,751 |
| $f_9$ | 1,864 |
| $f_{10}$ | 1,977 |

It will be noted that there is a constant frequency difference of 113 c./s. between adjacent frequencies, and that the lowest frequency 960 c./s. allows an adequate margin above 900 c./s. so that the sidebands about the 960 c./s. carrier will not exceed the maximum permitted energy level in frequencies below 900 c./s.

The method by which the bits in the 8-bit character are split and divided between the two data channels will be appreciated from the following table where it will be seen which frequencies correspond to the combination of the pair of bits.

| | | | | |
|---|---|---|---|---|
| Bits 1 5 | 0 | 0 | 1 | 1 |
| or | | | | |
| Bits 2 6 | 0 | 1 | 0 | 1 |
| Data Channel A | $f_3$ | $f_4$ | $f_5$ | $f_6$ |
| Bits 3 7 | 0 | 0 | 1 | 1 |
| or | | | | |
| Bits 4 8 | 0 | 1 | 0 | 1 |
| Data Channel B | $f_7$ | $f_8$ | $f_9$ | $f_{10}$ |

Thus it will be seen that the information in the first half of the character is transmitted by the first element of the signal, bits 1 and 2 over data channel A and bits 3 and 4 over data channel B. The second element of the signal similarly deals with the second half of the character, data channels A and B each being concerned with a pair of bits.

It is assumed that the transmitter is of conventional design and is operated from a paper tape reader which has an independent timing channel giving two signals which are alternately 1 and 0 for each element or half-character.

Referring now to FIGURE 1 which shows in block diagram form the equipment at the transmitting end, this comprises separate oscillators O1, O2 and O3 for the timing channel and the two data channels respectively and these are connected in parallel. Rectifiers D1 and D2 in series are connected across the output for protection purposes and the signals to be transmitted on the three channels are applied to the telephone line comprising conductors L1 and L2 by way of the rectifier bridge constituted by rectifiers D3–D6. An amplifier-limited AL is also provided for responding to an acknowledgement signal from the receiver.

The interface terminals 1 to 7 shown on the left of the oscillators control the frequencies transmitted to line. In the timing channel and the two data channels, the corresponding interface terminals are in each case either all left disconnected or one of these only is connected to earth. For each of the possible arrangements of the connections of the interface terminals in any of the three channels, a different frequency is transmitted to line. The tone transmitted in the timing channel may therefore have one of two different frequencies at any time, and the tone transmitted in either data channel may have one of four different frequencies. The precise relationship between the frequency transmitted to line and the interface connections in each of these channels, is as shown in the following table:

| | | | | | |
|---|---|---|---|---|---|
| Timing Channel | Terminal Earthed | None | ---- | 1 | ---- |
| | Frequency Transmitted | $f_1$ | ---- | $f_2$ | ---- |
| Data Channel A | Terminal Earthed | None | 2 | 3 | 4 |
| | Frequency Transmitted | $f_3$ | $f_4$ | $f_5$ | $f_6$ |
| Data Channel B | Terminal Earthed | None | 5 | 6 | 7 |
| | Frequency Transmitted | $f_7$ | $f_8$ | $f_9$ | $f_{10}$ |

Thus for example, in the case of Data Channel A. if terminal 2 is earthed, oscillator $O_2$ transmits a signal of frequency F4.

In order to simplify the various diagrams, it has been assumed that the paper-tape reader is operating at exactly 20 characters per second, giving a modulation rate in the signals transmitted to line of exactly 40 elements per second.

The detailed method by which an 8-bit character is converted into two consecutive 4-bit characters at the transmitter and the method by which the duration of each of the two 4-bit characters is determined by the timing channel, will not be explained here but can be achieved by various well known techniques. The relationship between the composition of typical 8-bit characters on the paper tape and the corresponding frequencies transmitted to line, is shown in the following table:

| | | | | | | | | |
|---|---|---|---|---|---|---|---|---|
| Timing Channel | 1 | 0 | 1 | 0 | 1 | 0 | 1 | 0 |
| Tape Channel 1 | 1 | | 0 | | 1 | | 0 | |
| Tape Channel 2 | 0 | | 0 | | 0 | | 0 | |
| Tape Channel 3 | 1 | | 0 | | 1 | | 0 | |
| Tape Channel 4 | 0 | | 0 | | 0 | | 0 | |
| Tape Channel 5 | 1 | | 0 | | 1 | | 0 | |
| Tape Channel 6 | 1 | | 1 | | 1 | | 1 | |
| Tape Channel 7 | 1 | | 0 | | 1 | | 0 | |
| Tape Channel 8 | 1 | | 1 | | 1 | | 1 | |
| TERMINALS EARTHED | | | | | | | | |
| Timing Channel | 1 | ------ | 1 | ------ | 1 | ------ | 1 | ------ |
| Data Channel A | 3 | 4 | ------ | 2 | 3 | 4 | ------ | 2 |
| Data Channel B | 6 | 7 | ------ | 5 | 6 | 7 | ------ | 5 |
| FREQUENCIES TRANSMITTED | | | | | | | | |
| Timing Channel | $f_2$ | $f_1$ | $f_2$ | $f_1$ | $f_2$ | $f_1$ | $f_2$ | $f_1$ |
| Data Channel A | $f_5$ | $f_6$ | $f_3$ | $f_4$ | $f_5$ | $f_6$ | $f_3$ | $f_4$ |
| Data Channel B | $f_9$ | $f_{10}$ | $f_7$ | $f_8$ | $f_9$ | $f_{10}$ | $f_7$ | $f_8$ |

These characters it will be appreciated line up with the waveforms of FIGURES 5–8.

The block diagram of the receiver is shown in FIGURES 2, 3 and 9 and the waveforms obtained at different points in the receiver are shown in FIGURES 4–8. The incoming signal to the receiver is assumed to be the same as that generated by the transmitter.

The incoming signal from the telephone line comprising conductors L3 and L4 which is connected to the telephone line comprising conductors L1 and L2 via telephone exchange switching equipment, is fed to the three band-pass filters BF1–BF3 via the input stage IS, which acts as a buffer between the filters and the line. The band-pass filter BF1 accepts only the timing channel. The band-pass filters BF2 and BF3 accept only the data channel A and the data channel B respectively. In this way the three incoming tones are isolated from each other so that only one tone is fed to any one of the amplifier limiters at any time.

After being amplified in the amplifier limiter AL1, the timing signal is fed to a discriminator D. This is assumed to comprise a discriminator of the type described on pp. 586 and 587 and illustrated in FIG. 53 of "Radio Engineers' Handbook," by Terman, published by McGraw-Hill Book Company Inc. in 1943. The circuit illustrated therein is modified in a manner which will be obvious to those skilled in the art, to provide a balanced output on the two output terminals K and L (FIGURE 2) one of whose waveforms is the inverse of the other (FIGURE 4). When the received timing signal has the lower frequency $f_1$ c./s., a negative output voltage is obtained at the terminal K and a positive output voltage at the terminal L. When the timing signal has the higher frequency $f_2$ c./s., the voltages at K and L are positive and negative respectively. The signals at K and L are compared in a voltage comparator circuit VC which gives a balanced output on the two output terminals M and N. The voltage comparator circuit VC may be of the kind described in Section 9, 12, pp. 341 to 343 of "Waveforms," by Chance et al., published by the Massachusetts Institute of Technology Radiation Laboratory. The waveforms at the terminals M and N have very sharp positive- and negative-going transitions which coincide in time with the points at which the signals at K and L have exactly the same voltage. The waveforms at M and N are fed to a single shot multivibrator or monostable circuit MS1. The input of this circuit differentiates the two waveforms and gates out the positive-going pulses, leaving the negative-going pulses to trigger the circuit MS1. The period of this circuit is adjusted to exactly 17 milliseconds, leaving a rest period of 8 milliseconds following each operation of the circuit. This assumes a duration of 25 milliseconds for each received signal element, corresponding to a modulation rate of 40 elements per second, which is obtained with a signalling speed of 20 characters per second. As the signalling speed is reduced, so the rest period following each operation of the circuit MS1 is correspondingly increased, the period of the circuit remaining unchanged at 17 milliseconds. The output waveform from the circuit MS1 is obtained at the terminal Q, this waveform being negative during the operation of the circuit and positive during the rest periods.

The waveform at Q and the waveform at M are fed to an OR gate G1 (negative logic) to give the waveform at S. Similarly the waveform at Q and the waveform at N are fed to another OR gate G2 to give the waveform at T. The waveforms at S and T are fed through buffer amplifiers BA1 and BA2, FIGURE 3 respectively, whose main function is to decrease the rise time of these waveforms so that the rising edges of the output waveforms at U and V can be used to trigger the bistable circuits Z1 and Z8, FIGURE 9. The effect of these buffer amplifiers is not shown in FIGURE 4 where it is assumed for simplicity that the waveforms U and V are of the same shape as the waveforms S and T respectively.

The waveform at V is fed to a further monostable circuit MS2 which is triggered by the sharp positive-going edges ot give the waveform at W. The period of the circuit MS2 is quite short, being of the order of one millisecond, and the waveform at W is positive during the operation of the circuit. The negative-going edges of the waveform at W are used to trigger the timing waveform generator TG. This is a blocking oscillator whose output waveform has a very short positive-going pulse coincident with each negative-going edge in the waveform at W. The output signal from the timing waveform generator is the receiver timing waveform X and this is fed together with the output signals from the carrier detector, error detector and the eight bistable circuits Z1 to Z8, to the logical equipment which is associated with the receiver.

The discriminator D in the timing channel is so designed that the sum of the voltage levels at K and L, when measured relative to their most positive values, is a linear function of the input carrier level to the discriminator at F and does not vary much when the signal changes in frequency from $f_1$ to $f_2$ c./s. or vice versa. In the carrier detector CD the sum of the voltage levels at K and L is measured by feeding said voltage levels through respective resistors into a conventional current adder. When the magnitude of this sum drops to below a half of its normal value, then the carrier detector indicates loss of signal. The gain of the amplifier limiter AL1 is arranged to be very stable and to have a value such that the carrier detector indicates loss of signal when the level of the timing signal reaching the receiver has dropped to below −50 dbm.

The operation of the receiving equipment in each data channel in accordance with the frequency received is effected in so-called matched-filter detectors. Each of these is assumed to comprise a tuned circuit subject to a gating waveform which permits a signal of the correct frequency to build up oscillations in the tuned circuit. These are sampled just before the gate closes and then quenched. Signals of other frequencies result in a smaller build-up followed by a decay. An arrangement using what are in effect matched-filter detectors is described in "Multitone Signalling System Employing Quenched Resonators Use On Noisy Radio-Teleprinter Circuits" by Robin et al., pp. 1554 et seq., Proc. I.E.E., vol. 110, No. 9, September 1963.

Figure 7:
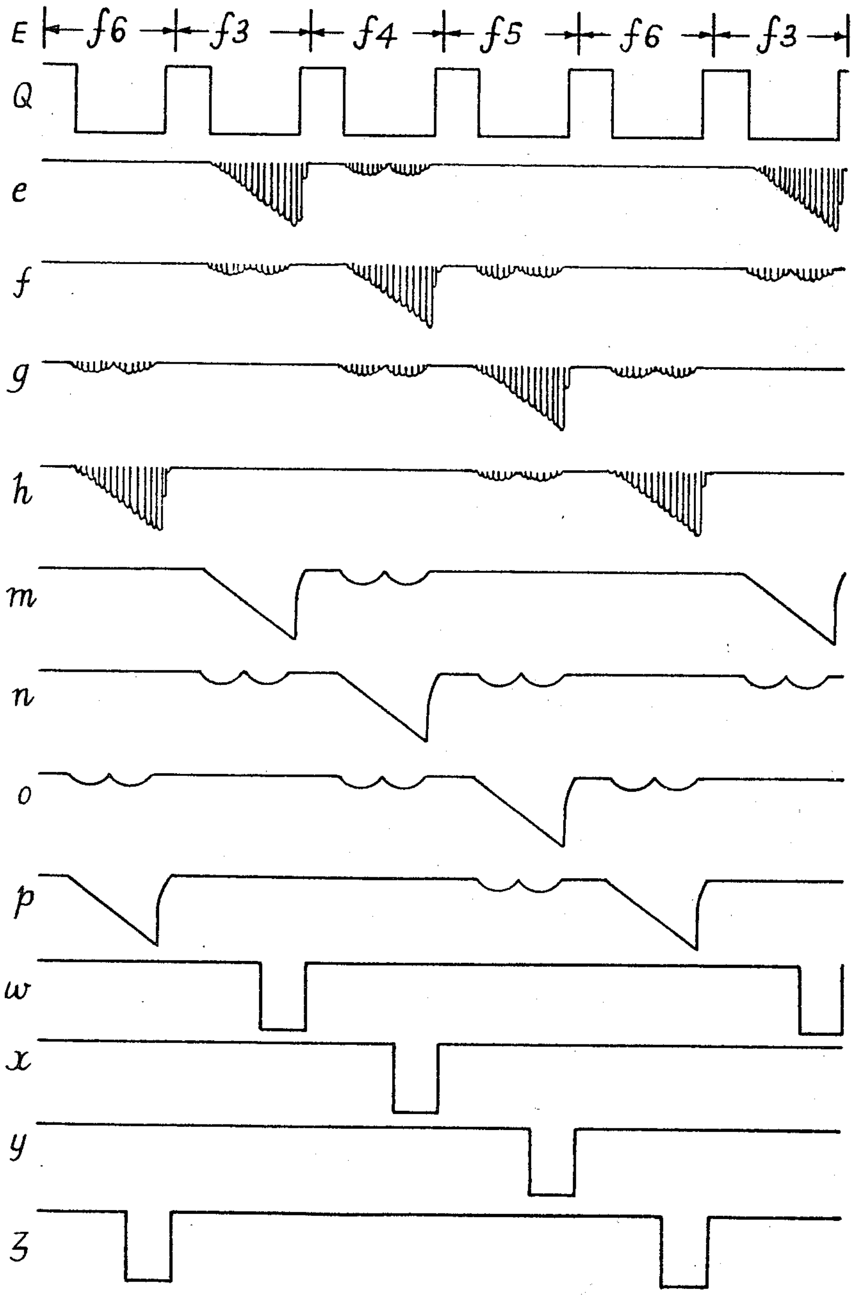
Figure 8:
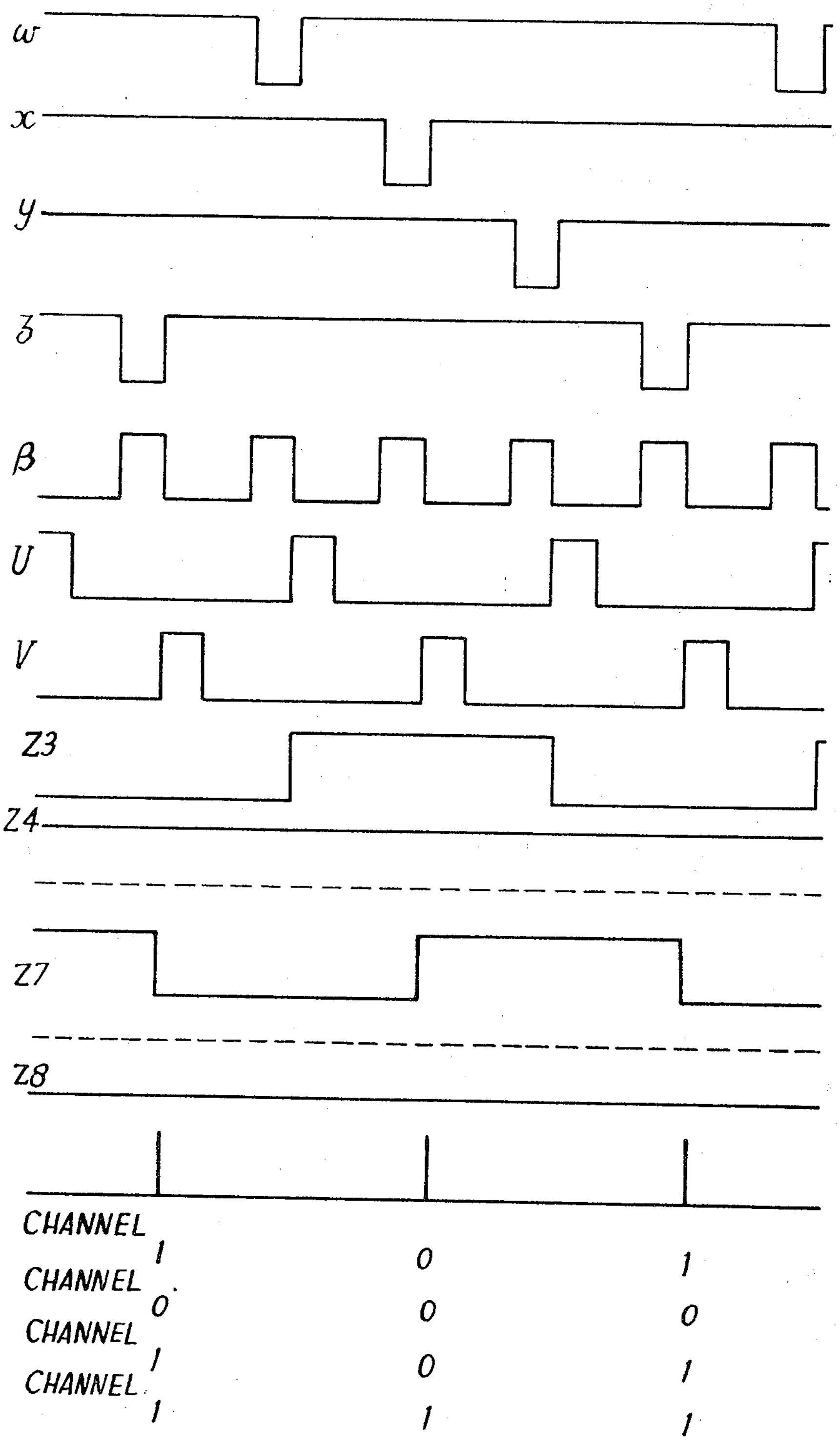

The signal at Q, FIGURES 5 and 7, is used to gate the input to each of the matched-filter detectors MD1–MD8 so that the output signal from either amplifier limiter AL2 or AL3 is only fed to its four matched-filter detectors when the signal at Q is negative. Thus as soon as the arrival of a new signal element has been detected by the discriminator D, the gate blocking the input signal to each of the detectors MD1–MD8 is opened and then remains open for exactly 17 milliseconds after which it is closed again. The gate at the input of each detector blocks the incoming signal by connecting a very low impedance across the tuned circuit in the matched-filter detector. This method of gating the input signal has the advantage that it not only blocks the incoming signal but it also quenches any signal voltage developed across the tuned circuit, thus resetting the output signal of the detector to zero and holding it in this condition until the gate is opened again. Each detector contains a parallel tuned circuit, the signal across which is connected to the input of an amplifier whose output signal is fed back to the tuned circuit in such a sense as to be in phase with the signal across the tuned circuit. The degree of positive feedback applied to the tuned circuit is adjusted to increase its Q to infinity.

Each matched-filter detector full-wave rectifies the signal obtained across the tuned circuit, thus giving at the output terminal (*a* to *h* in FIGURE 2) the characteristic waveforms shown in FIGURES 5 and 7.

FIGURE 11 shows one of the matched-filter detectors MD1–MD8. The input from the associated amplifier limiter is connected to the primary winding 20 of the transformer. The secondary winding 21 of this transformer, in conjunction with capacitor 22 forms the tuned circuit. An AND gate 23, controlled by the signal at Q is connected across the tuned circuit Q to provide a quenching path, as already explained. A full wave rectifier 24 is connected to the output of the tuned circuit. The output of the full-wave rectifier 24 is connected to the associated one of the low-pass filters LF1 to LF8. An amplifier 25 is connected to provide the required feedback to increase to the Q value of the tuned circuit to infinity.

When the incoming signal to a matched-filter detector is at the resonant frequency of the detector, the signal voltage across the tuned circuit builds up linearly with time from the moment that the input signal gate is opened by the waveform at Q. The linear build-up is obtained because there is no energy loss or gain in the tuned circuit and so the amplitude of the signal across the tuned circuit is increased by the same amount for each cycle of the incoming signal. Immediately the monostable circuit MS1 resets to give a positive output at Q, this rapidly quenches the signal across the tuned circuit and then holds the latter in a condition where negligible signal voltage can build up across it.

When the incoming signal to matched-filter detector is one of the two frequencies immediately adjacent to that at which the particular detector resonates, the signal across the tuned circuit is still at the resonant frequency of the tuned circuit but at a much lower level and with its envelope rising to a maximum and decaying to zero again at the difference frequency between the incoming signal and its own resonant frequency. Since the difference frequency between two adjacent carrier frequencies is 113 c./s., this means that the signal across the tuned circuit builds up from zero to a peak and then decays to zero again over a period of 8.85 milliseconds. Thus during the 17 milliseconds when the input signal gate is open, the signal across the tuned circuit will have twice built up to a peak and will very nearly have reached zero for the second time before the gate closes. In this way there is produced the characteristic rectified waveform at the output terminals of the matched-filter detectors when the incoming frequency is that of the adjacent detector.

When the incoming signal to a matched-filter detector is the nearest but one to that of the particular detector, the level of the detector output signal is much lower again and builds up this time to four peaks before the input signal gate closes. The levels of these signals are so low that they are not shown in FIGURES 5 and 7.

The output of eash matched-filter detector is fed to a low-pass filter such as LF1–LF8 which is assumed to be a simple three-section R–C network. Each low-pass filter removes the high-frequency components from the input signal, to give at its output terminal (*i* to *p*) the corresponding smoothed waveform, as shown in FIGURES 5 and 7.

In order to prevent an excessive delay in the time taken for the signal at the output of a low-pass filter to return to zero after the input signal gate has closed, the signal at Q is used also to reset the output of each low-pass filter, by causing the capacitors here to be rapidly discharged when the voltage at Q goes positive.

The output of each low-pass filter LF1–LF8 is fed to a voltage comparator circuit VC1–VC8 (terminals *i* to *p*). The four voltage comparators VC1–VC4 in the data channel A have a common terminal *q* and the four voltage comparators VC5–VC8 in the data channel B have a common terminal *r*. Each of these terminals is also connected to a voltage comparator VC9 and VC10 associated with the error detector ED (FIGURE 3). The output signals of the voltage comparators in the data channels are fed to the terminals *s* to *z* (FIGURES 2 and 3).

The essential part of each voltage comparator is a silicon pnp transistor whose base is connected to the input reference voltage. This is a fixed voltage RV in the case of the voltage comparators VC9 and VC10 associated with the error detector, and it is one of the terminals *i* to *p* in the case of the voltage comparators VC1–VC8 in the data channels. The emitter of each of the transistors is connected to one of the terminals *q* or *r*. Whichever of the five transistors connected to either terminal *q* or *r* has the most negative voltage at the base, this transistor is switched on to pass a fixed current from the emitter to the collector and this current is used to switch the output circuit in the comparator to give a negative output signal. The other four silicon transistors in each group of five are cut off, the corresponding output signals being positive. Thus only one of the five voltage comparators in each group can give a negative output signal at any time, the output signals from the other four being always positive.

FIG. 12 shows the arrangement of the voltage comparators VC1–VC4 and VC9 which are connected to the terminal *g*. It will be noticed that the collectors of the five transistors are shown connected directly to the respective terminals *s, t, u, v,* and *α*. With this arrangement, a positive output would be produced by the conducting transistor whereas, as stated above, a negative output is required. Consequently it is necessary to interpose a suitable inverter stage between the collector of each transistor and the output terminal of the respective voltage comparator. Since suitable circuits for this purpose will readily occur to those skilled in the art, they have been omitted from FIG. 12 in order to avoid unnecessary complication of the drawings. The arrangement of the voltage comparators VC5–VC8 and VC10, which are connected to terminal *r*, is similar.

The output signals from the eight voltage comparators VC1–VC8 in the data channels ₁terminals *s* to *z* are fed to the eight bistable circuits, Z1 to Z8, which provide the eight data signals at the receiver output (FIGURE 9). The waveforms at the terminals U and V are generated in the receiver timing channel (see FIGURE 4) and the rising edges of these waveforms are used at the inputs of the eight bistable circuits Z1 to Z8 to sample the eight data signals at the terminals *s* to *z*. The arrangement used for resetting the output signals of the low-pass filters LT1–LF8 at the end of each detection period is such that the sampling of the eight data signals at the terminals *s* to *z* is completed before any decay can occur in the output signals of the low-pass filters. Any of the eight bistable circuits can only change from one stable state to the other at the arrival of a rising edge in the timing waveform at U or V. By means of the logical design shown in FIGURE 9, the data signals at the terminals *s* to *z* are used to gate the rising edges of the appropriate timing waveform into one or other of the two inputs of any bistable circuit, so that at each rising edge the latter adopts the stable state corresponding to the particular data signals being received. When the resultant data signal fed to one of the two inputs of a bistable circuit is positive, this blocks the timing signal from that input. When it is negative, it allows the timing signal to pass through and to set the bistable circuit into the appropriate stable state. Since only one of the waveforms at the terminals *s* to *v* and one of the waveforms at the terminals *w* to *z* can be negative at any time, the others all being positive, only one of the two resultant data signals fed to any of the eight bistable circuits can be negative at any time, the other being always positive. Correct operation of each bistable circuit is therefore ensured under all conditions, because the appropriate timing signal can only be gated into one or other of the two inputs by the associated data signals.

During the periods when the reference voltage fed to the voltage comparator associated with the error detector ED is more negative than the reference voltages fed to the corresponding four voltage comparators in the data channels, all four of the output waveforms from the latter circuits will be positive. During these periods, no timing signal will therefore be allowed through to either input of the four bistable circuits fed from the four voltage comparator circuits and these bistable circuits will therefore remain in their existing states.

The error detector (FIGURE 3) is essentially a bistable circuit which can be set to give a negative output signal when triggered by the rising edge of either of the timing waveforms at U and V. The outputs of the two voltage comparators VC9 and VC10 associated with the error detector (terminals *α* and *β*) as well as the output of the carrier detector (terminal R), are fed to an OR gate G3 (negative logic) whose output signal is fed to one of the two signal inputs of the bistable circuit. The output of the AND gate G4 to which the timing waveforms at U and V are fed, is also fed by way of gate G5 to the same input terminal of the error detector. The timing waveforms are accordingly gated by the resultant signal from the two voltage comparators and the carrier detector, so that when the latter signal is negative at the occurrence of a rising edge in the waveform at U or V, the rising edge is fed to the input of the bistable circuit where it sets this to give a negative output voltage. When the signal from gate G3 is positive, the rising edges in the waveforms at U and V are blocked from the input to the bistable circuit. Thus whenever the output of either of the voltage comparators is negative, indicating an error condition in the output signals of one or more of the post-detection low-pass filters LF1 to LF8 in the receiver, or when the output of the carrier detector is negative, indicating the loss of the received signal, then an error condition is indicated to the error detector. If this condition persists during the occurrence of a rising edge in either of the timing waveforms at U and V, then, at the occurrence of this rising edge, the error detector output signal (the error signal) goes negative to indicate that an error has been detected and may give an alarm. The error signal always remains negative until the arrival of the following positive pulse in the receiver timing waveform (terminal X). This timing waveform is fed to the other of the two inputs of the bistable circuit in the error detector and it resets this to give a positive output signal which persists until the next error is detected, and so on.

For a short period after the waveform at terminal Q has just gone negative, thus opening the input signal gates to the matched-filter detectors, the output signals from the two voltage comparators VC9 and VC10 associated with the error detector (terminals $\alpha$ and $\beta$), will both be negative. This is because at this time the voltage output from none of the eight post-detection low-pass filters will have reached the fixed negative reference voltage which is applied to the two voltage comparator circuits associated with the error detector and hence during this period the output signals from the eight voltage comparators VC1–VC8 in the data channels will all be positive. The reason of course why a bistable circuit is used in the error detector is that this circuit is only interested in the levels of the output signals from the post-detection low-pass filters at the instants when these signals, after being fed through the voltage comparators, are sampled by the rising edges in the waveforms at U and V. Each of these rising edges occurs at the end of the corresponding detection process. If none of the four output signals from the low-pass filters in either data channel A or in data channel B reaches a sufficient level before being sampled, this indicates the presence of excessive interference in the data channel or else the fact that due to a fault in the timing channel the input signal gate has opened at the wrong time so that the data channels change their frequencies while the input signal gate is open. This method of error detection therefore gives protection against errors caused by noise in both the data channels and in the timing channel. With this arrangement, undetected errors can only be produced by a noise signal of constant fundamental frequency lying very close to one of the six carrier frequencies which are not being used in the two data channels taken together. The noise signal must also have a mean level over the whole of the 17 millisecond detection period which is at least as great as the sum of the levels of the wanted tone and all other noise frequencies in that channel. The probability of this occurring over telephone circuits is clearly of a very low order under most normal conditions.

The receiver output timing waveform X, which consists of very short positive pulses, is slightly delayed relative to the second, V, of the other two timing waveforms U and V. It may be used in logical circuits which may be fed from the receiver to sample the output signals from the eight bistable circuits Z1 to Z8. An examination of the states of these output signals at the instants when sampled by this timing waveform X shows that the receiver output signal comprises a parallel 8-channel signal identical to the corresponding 8-channel signal on the paper tape at the transmitter. The use of the waveform X in this way ensures that sampling of the eight bistable circuits Z1 to Z8 will take place at times when they are not changing state. The receiver thus recodes the received multifrequency signal to reconstitute the original signal on the paper tape. The same principle would of course be applied if the transmitter were fed from a punched-card reader or from a manual keyboard.

The receiver output timing waveform X would also be used in the logical circuits fed from the receiver to sample the error signal obtained at the output from the error detector. A negative level in this signal at the instant of sampling indicates that the corresponding character is in error. As already mentioned the receiver output timing waveform X is also used in the receiver to reset the error detector to give a positive output level, the error detector remaining in this condition unless again set to give a negative output signal at a rising edge in the waveform at U or V.

The output signal from the carrier detector can be used in the logical circuits fed from the receiver to differentiate between a detected error caused by loss of signal and one caused by interference in the receiver timing or data channels.

The logical design of the receiver (FIGURE 9) is such as to reconvert the two quaternary signals at the outputs of the voltage comparators in the data channels A and B (terminals $s$ to $z$) into eight binary signals at outputs of the eight bistable circuits Z1 to Z8. Since it is required that the output signals obtained from these eight binary channels shall be the same as the corresponding signals in the eight channels on the paper tape at the transmitter, the decoding arrangement used here is the inverse of the coding arrangement used at the transmitter.

The rising edge of the timing signal at U samples the first of the two elements in each received data character, as fed to the terminals $s$ to $z$, and the rising edge of the timing signal at V samples the second element. The first of these elements contains the information in the first 4 bits of each 8-bit character and the second element contains the information in the second 4 bits. The bistable circuits Z1 to Z4 are then used to store the first half of the character and the bistable circuits Z5 to Z8 to store the second half.

The relationship between the incoming frequencies and the signals at the terminals $s$ to $z$ is as shown in the following table:

| | | | | | |
|---|---|---|---|---|---|
| Data Channel A | Incoming Frequency | $f_3$ | $f_4$ | $f_5$ | $f_6$ |
| | Terminal having a negative voltage | $s$ | $t$ | $u$ | $v$ |
| Data Channel B | Incoming Frequency | $f_7$ | $f_8$ | $f_9$ | $f_{10}$ |
| | Terminal having a negative voltage | $w$ | $x$ | $y$ | $z$ |

The signals at the terminals $s$ to $z$ are sampled by the timing waveforms at U and V. The waveform at U samples the signals fed to the bistable circuits Z1 to Z4 and the waveform at V samples the signals fed to the bistable circuits Z5 to Z8. The relationship between the signals at the terminals $s$ to $z$ and the output signals from the bistable circuits, after the signals at these terminals have been sampled and thus used to set the bistable circuits into the corresponding stable states, are as follows:

| | | | | | |
|---|---|---|---|---|---|
| Data Channel A | Terminal having a negative voltage | $s$ | $t$ | $u$ | $v$ |
| | Z1 | 0 | 0 | 1 | 1 |
| | Z2 | 0 | 1 | 0 | 1 |
| | Z5 | 0 | 0 | 1 | 1 |
| | Z6 | 0 | 1 | 0 | 1 |
| Data Channel B | Terminal having a negative voltage | $w$ | $x$ | $y$ | $z$ |
| | Z3 | 0 | 0 | 1 | 1 |
| | Z4 | 0 | 1 | 0 | 1 |
| | Z7 | 0 | 0 | 1 | 1 |
| | Z8 | 0 | 1 | 0 | 1 |

It will be understood that 0 represents the normal or reset condition of a bi-stable circuit and 1 represents the operated or set condition. The above table can readily be checked from FIGURES 3 and 9.

Shortly after the second element in each character has been stored in the bistable circuits Z5, Z6, Z7 and 78, the output signals from all eight bistable circuits can be sampled by the receiver output timing waveform X in the logical circuits fed from the receiver. At these instants the correct 8-bit character signals are obtained. Thus the signal in channel 1 (that is the output signal from the bistable circuit Z1) is the same as the corresponding signal in channel 1 of the 8-channel paper tape at the transmitter, and so on for all eight channels. This is set out at the bottom of FIGURES 6 and 8.

By using a high gain in the amplifier limiters AL2 and AL3 and sufficient attenuation in the stop bands of the band pass filters BF2 and BF3, the receiver can be designed to operate correctly under conditions where the minimum attenuation in the band 900–2,000 c./s. is 30 db, this being at the low frequency end of the band, and where the attenuation distortion in this band is at least another 30 db.

Since each received signal element is sampled over a period of exactly 17 milliseconds, it follows that at the maximum transmission rate of 40 elements per second where the element duration is 25 milliseconds, there is a rest period of 8 milliseconds between each period when the received sigals are being detected. The correct design of the timing channel is such that the total delay between the transition of the timing signal from the output of the input stage IS to the output of the voltage comparator VC is 6 milliseconds more than either of the corresponding delays experienced by the data signals from the output of the input stage to the outputs of the respective amplifier limiters. This means that the timing signal at the terminal Q is switched to a negative voltage exactly 6 milliseconds after the received signals have changed frequency, assuming for this purpose that all three tones change frequency at the same instant. Thus the new frequencies in the two data channels have been received for 6 milliseconds before the input signal gates are opened and the detection process begins. Also these tones are received for another 2 milliseconds after the detection process has been completed. The instant at which the tone in either data channel changes from one frequency to another may therefore be advanced by up to 2 milliseconds or delayed by up to 6 milliseconds, relative to the instant at which the tone in the timing channel changes frequency, before beginning to cause faulty detection. Since the timing channel occupies that part of the available frequency band 900–2,000 c./s. at which there is normally the minimum group delay, the effect of delay distortion in the transmission path will be to delay the data signals relative to the timing signal. Thus the data transmission system will tolerate a skew or relative time delay in the operation of the relay contacts at the transmitter input of up to ±2 milliseconds between the operation of the contacts in either data channel and that in the timing channel. In addition it will tolerate delay distortions in the transmission path of up to 4 milliseconds in the band 900–2,000 c./s.

I claim:

1. For use in an electrical signalling system employing frequency modulation for the transmission of characters each of which comprises a plurality of binary bits, a receiver comprising timing channel filter means and first and second data channel filter means for separating a received signal into a timing channel signal component and first and ond data channel signal components, first tuned circuit means connected to said timing channel filter means for detecting frequency signals received therein, waveform producing means responsive to said first tuned circuit means for producing timing waveforms, second tuned circuit means connected to said first data channel filter means for detecting which of a first group of four frequencies constitutes a first data channel signal component, third tuned circuit means connected to said second data channel filter means for detecting which of a second group of four frequencies constitute the second data channel signal component, gating means responsive to said waveform producing means to be alternatively opened and closed for successive predetermined periods of time and operative when open to allow operation of said second and third tuned circuit means and when closed to inhibit operation of said second and third tuned circuit means and decoding means responsive to said second and third tuned circuit means for indicating receipt of a pair of bits corresponding to each of the frequencies received in said first and second data channels.

2. A receiver as claimed in claim 1, in which said decoding means is responsive to two successive frequencies in each data channel to indicate receipt of an eight-bit character.

3. A receiver as claimed in claim 1, in which said second and third tuned circuit means each comprises four resonant circuits each tuned to a respective one of the four possible signalling frequencies, said gating means being operative when open to allow current to build up in said resonant circuits and when closed, to quench oscillations therein.

4. A receiver as claimed in claim 1, in which said decoding means comprises eight bistable devices and said waveform producing means is arranged to produce a timing waveform for indicating when the bistable devices are set to indicate a received character.

5. A receiver as claimed in claim 1, for use in a system wherein the frequencies of the signals differ from adjacent frequencies by a constant value, in which the gating means is arranged to be opened responsive to a timing waveform from said waveform producing means, for successive time periods which are a small integral multiple of the reciprocal of said constant value.

6. A receiver as claimed in claim 1, in which the gating means is arranged to be open for successive time periods which are not less than the time period for which each frequency is received.

7. A receiver as claimed in claim 1, in which said waveform producing means is operative responsive to the receipt of signals in the timing channel which comprise two frequencies which are received alternately.

8. A receiver as claimed in claim 1, including error detecting means comprising testing means for each data channel for determining whether the outputs of the second and third tuned circuit means respectively reach a predetermined minimum value and switching means for performing a switching operation if said predetermined minimum value is not achieved.

9. A receiver as claimed in claim 8, in which each of said testing means comprises five transistors having their emitters connected together, four of which have their bases connected to respective outputs of the respective associated tuned circuit means while the fifth has its base connected to a fixed voltage corresponding to said predetermined minimum value.

10. A receiver as claimed in claim 8, including timing channel testing means for detecting whether frequency signals are being received in the timing channel, said switching means being responsive to said timing channel testing means to perform said switching operation if said frequency signals are not received.

References Cited

UNITED STATES PATENTS

| | | | |
|---|---|---|---|
| 2,771,506 | 11/1956 | Coquelet | 178—51 |
| 2,865,994 | 12/1958 | Eldredge et al. | 178—51 X |
| 2,911,473 | 11/1959 | Van Duuren | 178—50 |
| 2,974,196 | 3/1961 | Van Duuren | 178—50 |
| 3,330,909 | 7/1967 | Willson | 178—50 |

ROBERT L. GRIFFIN, *Primary Examiner.*

WILLIAM S. FROMMER, *Assistant Examiner.*

U.S. Cl. X.R.

178—66; 325—30, 320